US009019975B2

(12) United States Patent
DeCusatis et al.

(10) Patent No.: US 9,019,975 B2
(45) Date of Patent: *Apr. 28, 2015

(54) UNIFIED SYSTEM NETWORKING WITH CEE-PCIE TUNNELING

(71) Applicant: International Business Machines Corporation, Armonk, NY (US)

(72) Inventors: Casimer M DeCusatis, Poughkeepsie, NY (US); Rajaram B Krishnamurthy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,968

(22) Filed: Dec. 13, 2013

(65) Prior Publication Data

US 2014/0169371 A1   Jun. 19, 2014

Related U.S. Application Data

(63) Continuation of application No. 13/720,341, filed on Dec. 19, 2012.

(51) Int. Cl.
*H04L 12/28* (2006.01)
*H04L 12/931* (2013.01)
(Continued)

(52) U.S. Cl.
CPC .......... *H04L 49/351* (2013.01); *G06F 13/4022* (2013.01); *H04L 45/74* (2013.01)

(58) Field of Classification Search
None
See application file for complete search history.

(56) References Cited

U.S. PATENT DOCUMENTS

2010/0183024 A1   7/2010  Gupta
2010/0214950 A1*  8/2010  Vobbilisetty .................. 370/254
(Continued)

FOREIGN PATENT DOCUMENTS

CN   102075437 A1   5/2011
EP     2477376 A1   7/2012
(Continued)

OTHER PUBLICATIONS

M. Gusat et al, "R3C2: Reactive Route & Rate Control for CEE", 18th IEEE Symposium on High Performance Interconnects, 2010, pp. 50-57.

(Continued)

*Primary Examiner* — Otis L Thompson, Jr.
(74) *Attorney, Agent, or Firm* — Steven Chiu

(57) ABSTRACT

Converged Enhanced Ethernet (CEE) tunneling over Peripheral Component Interconnect Express (PCIe) bus. An initiating device, connected to a CEE network, initiates a command. An encoding device encodes a CEE frame comprising the command, target device address, initiator signals, and an address of a CEE switch closest to the target device, connected to a PCIe network. The initiating device transmits an inquiry to the CEE switch through the CEE frame. The CEE switch comprises an address table with an entry specifying a generic PCIe device. The CEE switch is configured to convert the CEE frame into PCIe readable signals and to transmit them to PCIe devices. The initiating device receives a response indicating a PCIe acknowledgement from a corresponding device from the PCIe devices. The corresponding device is associated with the target device address. Based on the response, the initiating device initiates a transaction to the corresponding device through CEE frames.

11 Claims, 8 Drawing Sheets

(51) Int. Cl.
*G06F 13/40* (2006.01)
*H04L 12/741* (2013.01)

(56) References Cited

U.S. PATENT DOCUMENTS

| | | | |
|---|---|---|---|
| 2011/0051733 A1* | 3/2011 | Hirata | 370/400 |
| 2011/0058573 A1 | 3/2011 | Balakavi et al. | |
| 2011/0064086 A1* | 3/2011 | Xiong et al. | 370/401 |
| 2011/0078299 A1 | 3/2011 | Nagapudi et al. | |
| 2011/0206051 A1 | 8/2011 | Suzuki | |
| 2012/0144252 A1* | 6/2012 | Takada | 714/702 |
| 2013/0148546 A1* | 6/2013 | Eisenhauer et al. | 370/255 |
| 2013/0246650 A1* | 9/2013 | Tsuboki et al. | 709/236 |
| 2014/0169369 A1 | 6/2014 | Decusatis et al. | |

FOREIGN PATENT DOCUMENTS

| | | |
|---|---|---|
| WO | WO2012055660 A1 | 5/2012 |
| WO | WO2012110919 A1 | 8/2012 |

OTHER PUBLICATIONS

"New PCIe R/W Transaction Type for Direct VM-VM Data Transfer Using Single Source and Single Destination Address" (www.ip.com) IPCOM000185232D, Jul. 16, 2009.

IBM "Power Systems—Managing PCI Adapters", IBM Corporation, 2007, 2009.

* cited by examiner

UNIFIED SYSTEM NETWORKING WITH CEE-PCIE TUNNELING

CROSS REFERENCE TO RELATED APPLICATIONS

This application is a continuation of U.S. patent application Ser. No. 13/720,341, "UNIFIED SYSTEM NETWORKING WITH CEE-PCIE TUNNELING" filed Dec. 19, 2012, the contents of which are incorporated by reference herein in their entirety.

BACKGROUND

The present invention relates, in general, to computer system networking, and in particular, to system networking with tunneling.

Most modern computer systems use the Peripheral Component Interconnect Express (PCIe) bus as a standard interconnect with network adapter cards, for example in the backplane of a computer system. However, PCIe bus data rates are being overtaken by data rates for lossless Ethernet, also known as Converged Enhanced Ethernet (CEE).

BRIEF SUMMARY

According to one embodiment of the present invention, a method, system, and program product is provided for Converged Enhanced Ethernet (CEE) tunneling over Peripheral Component Interconnect Express (PCIe) bus. The initiating device initiates a command, said initiating device connected to a CEE network. An encoding device associated with said initiating device encodes a CEE frame. The CEE frame comprises the command, an address of a target device, one or more initiator control signals, and an address of a CEE switch closest to said target device. The target device is connected to a PCIe network. The initiating device transmits an inquiry to the CEE switch. The inquiry is transmitted through the CEE frame. The CEE switch comprises an address table. The address table comprises an entry specifying a generic PCIe device. The CEE switch is configured to convert the CEE frame into PCIe readable signals. The CEE switch is configured to transmit the PCIe readable signals to one or more PCIe devices connected to the PCIe network. The initiating device receives a response from a corresponding device from the one or more PCIe devices. The corresponding device is associated with the address of the target device. The response indicates a PCIe acknowledgment. Based on the response, the initiating device initiates a transaction to the corresponding device through one or more CEE frames.

According to one embodiment of the present invention, initiating, by the initiating device, a transaction further comprises the following. Based on the command being a write command, the initiating device transmits one or more write command associated CEE control frames to the corresponding device. The one or more write command associated CEE control frames comprise data corresponding to the write command. Based on the command being a read command, the initiating device receives one or more read command associated CEE control frames from the corresponding device. The one or more read command associated CEE control frames comprise data corresponding to the read command.

According to one embodiment of the present invention, initiating, by said initiating device, a transaction further comprises the following. Based on the command being a read command, the corresponding device transmits one or more read command associated CEE control frames to the initiating device. The one or more read command associated CEE control frames comprise data corresponding to the read command. Based on the command being a write command, the corresponding device receives one or more write command associated CEE control frames from the initiating device. The one or more write command associated CEE control frames comprising data corresponding to the write command.

According to one embodiment of the present invention, a receiving device of the one or more PCIe devices receives the inquiry. The inquiry comprises the address of the target device. Based on the inquiry, the receiving device checks to see if the receiving device is associated with the address of the target device. Based on the receiving device being associated with the address of the target device, the receiving device transmits the response to the initiating device. The receiving device is the corresponding device.

According to one embodiment of the present invention, encoding, by an encoding device associated with said initiating device, a CEE frame further comprises the following. The encoding device mimics a delay and request signal. The encoding device encodes the delay and the request signal into the CEE control frame.

According to one embodiment of the present invention, encoding, by an encoding device associated with the initiating device, a CEE frame further comprises the following. The encoding device mimics the one or more initiator control signals.

According to one embodiment of the present invention, the CEE control frame comprises a header and a payload. The header identifies the CEE control frame as PCIe. The payload comprises control signal fields corresponding to the one or more initiator signals, arbitration signals, and target control signals.

According to one embodiment of the present invention, the CEE switch is configured to map PCIe control signals associated with the corresponding device, data associated with the corresponding device, or a combination thereof into a CEE frame.

According to one embodiment of the present invention, the initiating device, through a networking interface control, performs a parity check for each received CEE frame. The CEE switch performs a parity check for each CEE frame received at the CEE switch.

According to one embodiment of the present invention, based on the response, the CEE switch updates the address table entry specifying the generic PCIe device to an address of the corresponding device.

According to one embodiment of the present invention, based on the transaction being complete and based on a PCIe network idle check, the CEE switch resets the update table entry specifying the corresponding device back to the generic PCIe device entry.

DETAILED DESCRIPTION

In accordance with an embodiment, a method, system, and computer program product is provided for tunneling over a network, in particular Converged Enhanced Ethernet (CEE) networks tunneling over Peripheral Component Interconnect Express (PCIe). PCIe is defined by the PCIe base specification, which may be found in "PCI Express® Base Specification Revision 3.0 Version 0.9" published Aug. 10, 2010, incorporated herein by reference. CEE is defined by the lossless Ethernet specification from the IEEE, which may be found in "IEEE Standard for Information technology-Specific requirements—Part 3: Carrier Sense Multiple Access with Collision Detection (CSMA/CD) Access Method and Physical Layer Specifications" published Jun. 22, 2010, reference number IEEE 802.3™-2008, incorporated herein by reference. The term data and information may be used interchangeably through the specification. The term initiator, initiator device, and initiating device may be used interchangeably through the specification. The term target and target device may be used interchangeably through the specification. The term frame and packet may be used interchangeable throughout the specification. The term lossless Ethernet frame and CEE frame may be used interchangeably throughout this specification. The term mapping and encoding may be used interchangeably throughout the specification.

Figure 1:
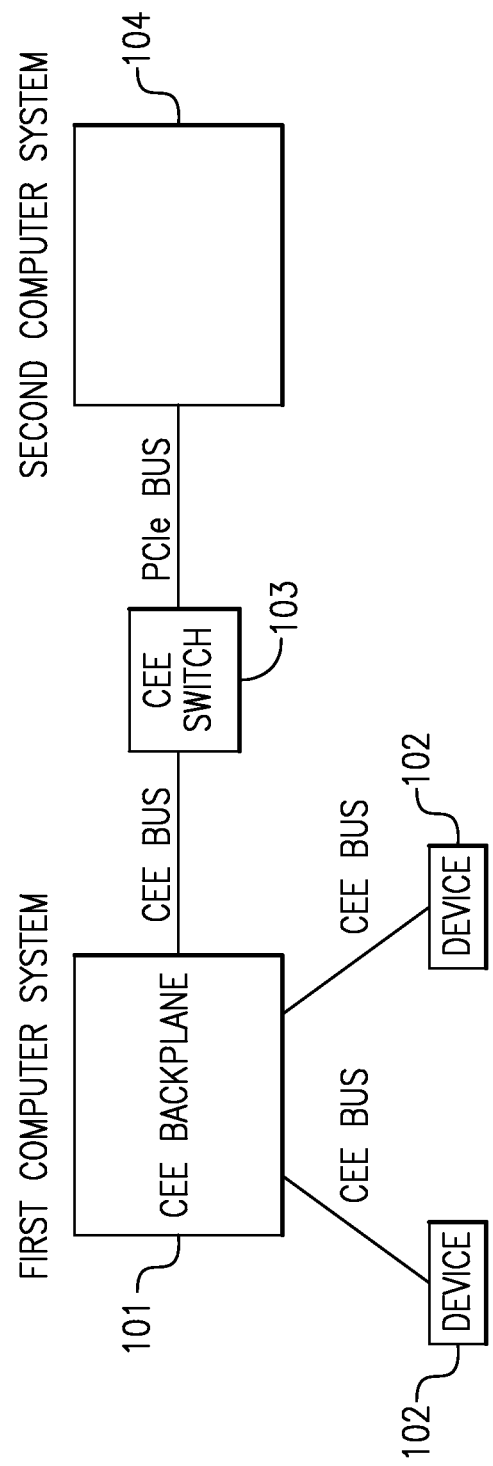
FIG. 1 illustrates one embodiment of a computer network in accordance with one or more aspects of the present invention.

One embodiment of a computer network in accordance with one or more aspects of the present invention is described in reference to FIG. 1. A first computer system 101 is connected to multiple devices 102, as well as across a network to a CEE switch 103, which is connected to a second computer system 104. The first computer system 101 may be connected to the CEE switch through a CEE network such as a CEE bus. The CEE switch 103 may be connected to the second computer system 104 through a PCIe network such as a PCIe bus. The second computer system 104 may be connected to multiple second computer system devices, not shown in the figure. In one embodiment, the second computer system 104 may be seen by the first computer system 101 as if it was one of the attached devices 104. In one embodiment, the first computer system 101 may see all devices attached to the second computer system 104, as well as the second computer system 104, as a single device. In one embodiment, the first computer system 101 may connect to the network through the use of a network interface controller (NIC), which may be internal or external to the computer system itself. The NIC may be connected to the devices 102 through a bus, such as a CEE bus. In one embodiment, the second computer system 104 may connect directly to the switch 103 without the use of a NIC. The second computer system devices may be connected to the second computer system 104 through a PCIe bus. Transmissions from one computer system to the other may be sent through one or more data frames, for example a lossless Ethernet frame, which would go through the CEE switch 103. In one embodiment, the first computer system 101 may have a backplane that uses a CEE bus to connect the first computer system devices 102. In one embodiment, the second computer system 104 may have a backplane that uses a PCIe bus to connect with the second computer system devices. For example, the PCIe bus may be a PCIe gen 3 bus, which is an 8 Gigabits per second serial bidirectional bus, where the 8 Gigabits per second is the nominal data rate.

Figure 2:
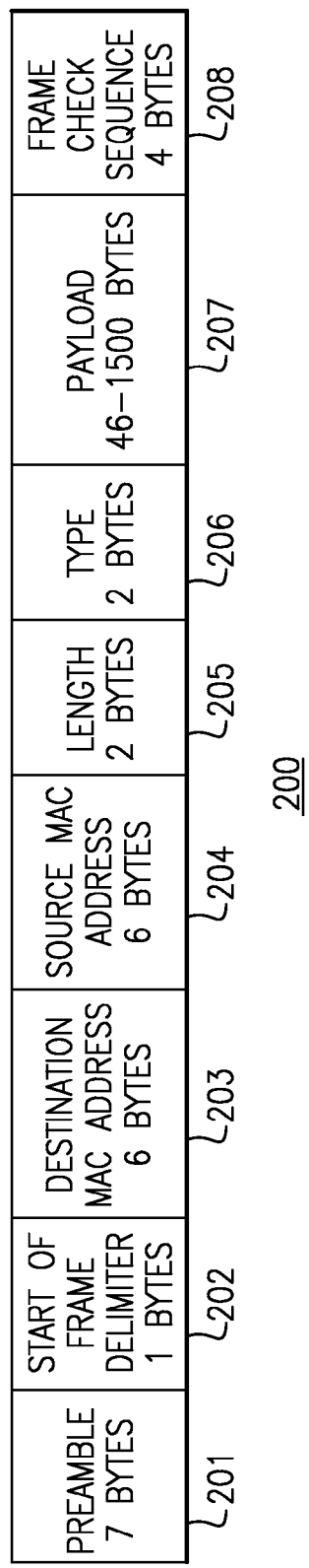
FIG. 2 illustrates one embodiment of a lossless Ethernet frame in accordance with one or more aspects of the present invention.

One embodiment of a lossless Ethernet frame in accordance with one or more aspects of the present invention is described with reference to FIG. 2. In this example, the Ethernet frame 200 includes fields such as a Preamble 201, a Start of Frame Delimiter (SOF) 202, Destination MAC Address 203, Source MAC address 204, Length 205, Type (Ethertype) 206, Payload 207, and Frame Check Sequence (for example, cyclic redundancy code or cyclic redundancy check) 208. In one embodiment, the Preamble is 7 bytes, the SOF is 1 byte, the Destination MAC address is 6 bytes, the Length is 2 bytes, the Type is 2 bytes, the Payload is 46-1500 bytes, and the Frame Check Sequence is 4 bytes. These fields are not limited to the above listed bytes and may have more or less bytes than listed. In one embodiment, the Preamble 201 allows devices on the network to detect a new incoming Ethernet frame. In another embodiment, the Preamble 201 may not used. In one embodiment, the SOF 202 marks the end of the Preamble. In one embodiment, the Destination MAC address 203 is the address of the receiving device, while the Source MAC address 204 is the address of the sending device. In one embodiment, the Length 205 may be used to indicate which protocol, such as PCIe, is encapsulated in the payload of the Ethernet frame. In one embodiment, the Type 206 may be used to indicate which protocol, such as PCIe, is encapsulated in the payload of the Ethernet frame. The Type 206 may indicate a PCIe protocol through a PCIe control frame ID sequence. Length 205 and Type 206 are examples of where a protocol indicator or tag may be stores. The protocol indicator may be located in another field. In one embodiment, the Payload 207 is used to store PCIe data. In one embodiment, the Frame Check Sequence 208 may be used to detect accidental changes in the packet, for example the header, payload, the Frame Check Sequence itself, etc.

Figure 3:
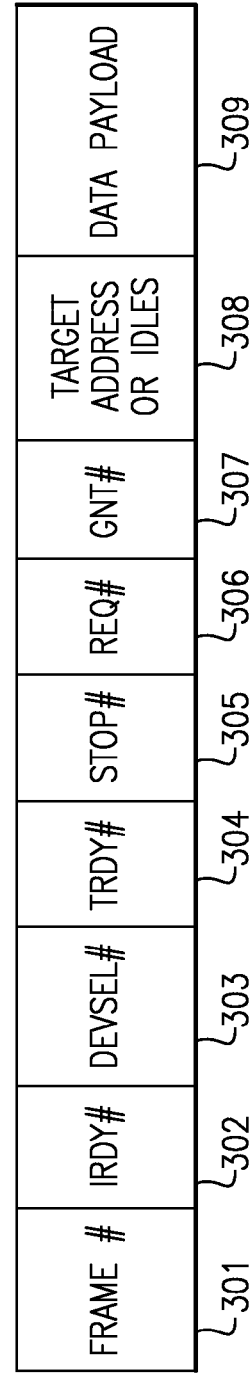
FIG. 3 illustrates one embodiment of a lossless Ethernet Frame Payload in accordance with one or more aspects of the present invention.

One embodiment of a lossless Ethernet frame payload in accordance with one or more aspects of the present invention is described with reference to FIG. 3. In this example, the lossless Ethernet frame payload further elaborates on the Payload 207 of FIG. 2. The lossless Ethernet Frame Payload may include fields such as FRAME#301, IRDY#302, DEVSEL#303, TRDY#304, STOP#305, REQ#306, GNT#307, Target Address or Idles 308, and Data Payload 309. FRAME#301, IRDY#302, DEVSEL#303, TRDY#304, STOP#305 correspond to the main control signals in PCIe. REQ#306 corresponds to a bus request signal. The GNT#307 corresponds to the grant signal from an arbiter. The Target Address or Idles 308 corresponds to either the target device address or an indication showing that the bus is idle. The Data Payload 309 may contain a command associated with the target, a delay frame, or other information to be transferred.

Five main control signals drive PCIe bus transactions. The initiator of the transaction drives two of the main control signals: FRAME# and IRDY#. The target of the transaction drives three of the main control signals: DEVSEL#, TRDY#, and STOP#. FRAME#, which is asserted by the initiator of the transaction, may be used to start a timer which counts clock cycles as part of a programmable latency circuit. IRDY#, which is asserted by the initiator of the transaction, may be used to indicate that a data phase transaction is complete. DEVSEL#, which is asserted by the target of the transaction, may be used for the following condition: if a target device examines the PCIe address and determines that it is the intended target, then it asserts DEVSEL# within a maximum of three clock cycles. TRDY#, which is asserted by the target of the transaction, may be asserted within 16 cycles of starting a transaction to indicate that the transaction is complete and the target is ready for the next step. STOP#, which is asserted by the target of the transaction, may be asserted instead of TRDY# to abort a transaction on the PCIe bus.

In additional to the five main control signals in the PCIe bus stated above, there are two additional arbitration signals, REQ# and GNT#. Any device on a PCIe bus that is capable of initiating transactions, for example capable of acting as a bus master, may initiate a transaction with any other device. Each device has a separate request line and may transmit a request signal, such as REQ#, which is sent to an arbiter to request access to the bus. The arbiter may be located on the motherboard and may be used to grant device access to the bus. To ensure that only one transaction is initiated at a time, each initiating device must first wait for a bus grant signal, such as GNT#, from the arbiter. The GNT# signal signifies that the requesting device is now allowed to use the bus. The arbiter may either provide or remove the GNT# signal at any time. By controlling this signal, the arbiter insures that only one transaction is active on the bus at a time. The arbiter may leave or assign the GNT# signal on a device attached to the bus even if no device on the bus is requesting access. This is also known as "parking" the GNT# signal.

All of the five main control signals, FRAME#, IRDY#, DEVSEL#, TRDY#, and STOP#, and the two additional arbitration signals, REQ# and GNT#, may be active low, meaning that the active or asserted state is a low voltage. Thus, in one embodiment, when a device is asserting a control signal, the asserted state is a low voltage. In this embodiment, all devices drive the signals high for one cycle before ceasing to drive the signals. This is performed to be consistent with PCIe standard conventions, which state that a signal high must be held for one cycle before ceasing to drive it. In another embodiment, the control signals may be an active high, meaning that the active or asserted state is a high voltage.

All of the PCIe bus signals may be sampled on the rising edge of the clock. Signals change on the falling edge of the clock. This allows each PCIe device approximately one half a clock cycle to decide how to respond to the signals that may be observed on the rising edge of the clock, and one half a clock cycle to transmit a response to the other device. When a device driving a PCIe bus signal changes, one turnaround cycle must elapse between the time the one device stops driving the signal and the other device starts. This turnaround cycle is used to prevent the situation where multiple devices try to drive the signal at the same time, which would interfere with bus operation.

For PCIe, each of the main control lines must be high for a minimum of two cycles when changing devices or owners. This is due to the turnaround cycle and the requirement to drive a control line high for one cycle as stated above. The two minimum cycles are also known as the idle cycle. In some situations, the idle cycle may be skipped, for example in fast back-to-back transactions. For these situations, it may be necessary to insert a delay to help synchronize the sending device and the receiving device, so that the receiving device will sample the transaction signal at the correct point. The fast back-to-back transaction refers to a situation where it may be necessary to skip the idle cycle between PCIe bus transactions, going directly from the final cycle of one transaction to the first cycle of the next transaction. An initiator may only initiate a back-to-back transaction when the transaction is by the same initiator, the first transaction was a write, and the initiator still has permission to use the PCIe bus.

A PCIe bus transaction begins with an address phase. The initiator or initiating device, seeing that it has received a GNT# from the arbiter and that the bus is idle, may drive a target address onto the AD[31:0] lines, the associated command (for example memory read or I/O write) on the C/BE [3:0]# lines, and drives FRAME# to a low. In one embodiment, the PCIe bus is attached to an expansion adapter card on the computer system, such as the NIC, and would drive the lines to the NIC. In one embodiment, the initiator detects that the bus is idle when FRAME# and IRDY# are both deasserted. Each other device connected to the computer system, whether through the PCIe bus or through a CEE network, may examine the target address and command and decide whether it is the appropriate target device corresponding to the target address. Each target device knows its own address and will be able to use its own address to make the comparison. Specifics as to how this is communicated with the devices or systems connected through the CEE network of the initiating device will be described subsequently in the paragraphs below. If one of the devices decides it is the appropriate target device corresponding to the target address, that device will respond as the target by asserting DEVSEL#. That device may respond by asserting DEVSEL# within 3 cycles. Devices which promise to respond within 1 or 2 cycles are said to have "fast DEVSEL" or "medium DEVSEL", respectively. On the sixth cycle, if there has been no response, the initiator may initiate a master abort termination. This will abort the transaction by deasserting FRAME#. In this situation, a PCIe bus bridge may return all-ones data (0xFFFFFFFF), for example returned in place of the requested data payload.

The PCIe bus is configured to detect parity errors, although it does not attempt to correct them by retrying an operation. It is purely a failure indication. Because of this, a parity error is not detected when it occurs. The PCIe bus detects a parity error a few cycles later. During a data phase, i.e. after the address (handshake) phase, the initiating device driving the AD[31:0] lines computes even parity over that line and the C/BE[3:0] lines. This parity is sent out over the PAR line one cycle later. All access rules and turnaround cycles for the address bus (AD) bus apply the PAR line, just one cycle later. The target device listening to the AD bus checks the received parity and asserts a parity error line, such as PERR#, one cycle after. This may generate a processor interrupt which allows the processor to search the PCIe bus for the device which detected that error.

Figure 4:
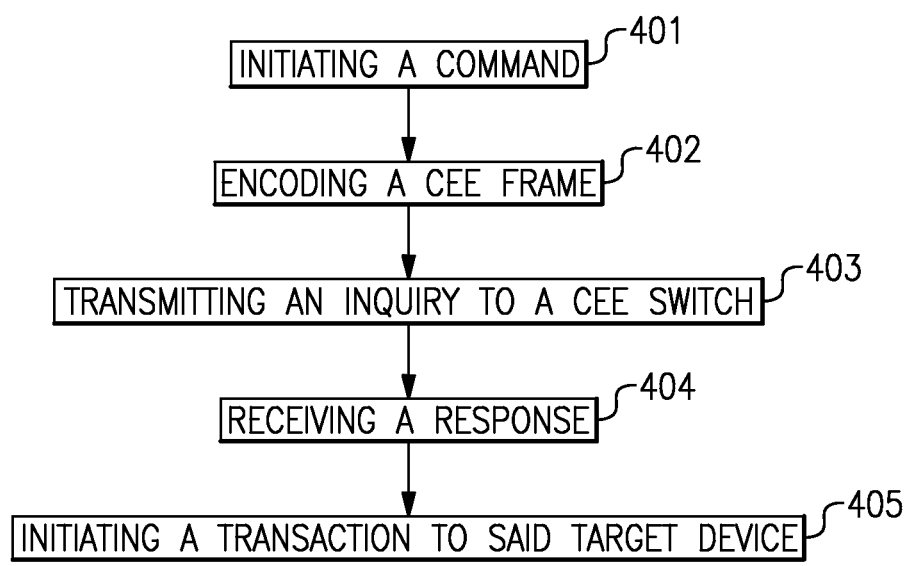
FIG. 4 illustrates one embodiment of a process in accordance with one or more aspects of the present invention.

One embodiment of a process in accordance with one or more aspects of the present invention is described in reference to FIG. 4. An initiating device, for example a device connected to a CEE network, initiates a command, 401. This command is associated with a target device, such as a PCIe device, and may be a read or write command. The initiating device, through a mapping device (such as a NIC connected to the initiating device, software on the initiating device or on the computer system attached to the initiating device, or a switch on the CEE network), may mimic PCIe initiator control signals associated with the command (for example FRAME# which starts the timer and IRDY# which indicates when the transaction is complete). These mimicked initiating control signals (FRAME# and IRDY#) are asserted as appropriate. The initiating device, though the mapping device, may also mimic a PCIe REQ# signal, so that it simulates what a typical PCIe initiating device would send to an arbiter to request access to a PCIe bus. The initiating device, through the mapping device, may also mimic a PCIe GNT# signal, so that it simulates what an arbiter would send back to a typical PCIe initiating device on a PCIe bus. The initiating device, through the mapping device, maps or encodes the initiator control signals (ex: FRAME# and IRDY#), an address of a target device, and a command into a CEE frame, 404. In one embodiment, the Type field in the CEE frame is populated with a PCIe control frame ID sequence. In one embodiment, the mapping device may also map a delay frame, and arbitration signals such as the request signal (for example, REQ#) and the grant request signal (for example, GNT#) into the CEE frame. The REQ# and the GNT# signals may be stored in the CEE in order to mimic the behavior of a locally attached PCIe peripheral on the bus. The delay frame may be mapped through the insertion of CEE idle characters into the payload of the CEE frame. The delay frame and the CEE idle characters may represent the delay that is needed to meet the turn-around cycle and the requirement to drive a control line high for one cycle.

The initiating device only knows the address of a target device at this point, as the command is associated with a target device. The initiating device maintains a lookup table of all the devices attached to the network so it knows the network topology. Thus, it knows which types of devices are attached at various points on the network. A PCIe target device may be identified as just another device type in the lookup table. In one embodiment, because a PCIe device is not normally addressed in a CEE network, the last switch, such as a CEE switch, before the PCIe network may be referenced as the address point in the Destination MAC address field in the CEE frame and may be stored in the lookup table. This is because a PCIe device does not have a MAC address, which a CEE device normally has. But because the last switch does have a MAC address, that is used instead. So in one embodiment, the Destination MAC address field is used to route the CEE frame to the appropriate destination.

The initiating device is unaware of which PCIe device in the network is actually the one associated with the target address. In one embodiment, there may be a single PCIe device or a plurality of PCIe devices connected to the network. Thus, a handshake (address phase) may be initiated by the initiating device to determine which PCIe device in the plurality of PCIe devices in the system corresponds to the address of the target device. An inquiry is transmitted by the initiating device, 405, to the plurality of devices, 403. For example, the plurality of devices may be PCIe devices and may be connected to a PCIe bus connected to the CEE network. When communicating with a device or system over a CEE network, a CEE frame mapped with the information previously stated above is used. For the purposes of this example, let's say that a corresponding device is connected to a PCIe bus, which is connected to the CEE switch, which is connected to the CEE network. Let's also say that it is the appropriate target device. This corresponding device may be apart of a system, for example second computer system 104 of FIG. 1, and may be connected to a PCIe backplane in the second computer system 104, or it may be the second computer system 104 itself. The CEE switch connected to the PCIe bus (which the corresponding device is connected to) receives the inquiry, extracts the necessary information from the various CEE frame fields, and sends them out to the appropriate PCIe control lines. In one embodiment, this is done in hardware on the CEE switch. In one embodiment, this is done in software on the CEE switch.

The plurality of devices on the PCIe network receives the address through the appropriate PCIe control lines and checks to see if the address of the target device matches its own address. If the addresses match, the corresponding device transmits a response back to the initiating device. This response notifies the initiating device that the corresponding device is the one the initiating device is looking for, i.e. the corresponding device corresponds to the address of the target device. The initiating device receives the response, 404. The response may be received through a CEE frame and may be comprised of one or more target control signals that are driven by the corresponding device, for example DEVSEL#, TRDY#, and STOP#. In one embodiment, even if TRDY# and STOP# are not necessarily asserted by the corresponding device at that time, they may still included in the response CEE frame. Once the initiating device is notified, for example DEVSEL# is asserted in the response, the initiating device initiates a transaction to the corresponding device, 405. The initiating device will start transmitting CEE data frames or will start receiving CEE data frames containing the data to be read or written, depending on the transaction command, such as a read or a write. In one embodiment, the CEE data frames are received by the CEE switch and routed to the appropriate PCIe device. In one embodiment, the transaction may be a read or a write to cache memory that may be used to buffer incoming data frames on a server or switch for subsequent processing. In one embodiment, the read or write may require multiple CEE control frames to be sent either from the initiating device, the corresponding device, or a combination thereof.

In one embodiment, the corresponding device, which is connected to a PCIe bus connected to a CEE switch, may map control signals into any CEE frames that is to be sent back to the initiating device. The mapping may be performed by a mapping device, such as the CEE switch connected to the PCIe bus. The mapping may be similar to the mapping performed by the initiating device, except no control signals would need to be mimicked. The control signals that are mapped on this end may include DEVSEL#, TRDY#, and STOP#. Additional data associated with a transaction may also be mapped.

In one embodiment, the CEE switch may route the CEE frames to the appropriate PCIe device by keeping track of PCI port addresses. A target PCIe device does not have a MAC address due to being directly attached to the CEE switch through a PCIe bus. As a result, the CEE switch, which is connected to the PCIe bus, needs to recognize that it should forward the packet to the corresponding PCIe port address associated with the PCIe device. The CEE switch may include hardware or software that recognizes that there is a PCIe device attached to the switch. The CEE switch may comprise a MAC address table containing an entry corresponding to this PCIe target device. Initially, this entry may contain a generic PCIe address that allows the CEE device to recognize that it belongs to some unknown PCIe target device. During the handshake phase, extracted PCIe signals from the CEE frame (which for example may be extracted by the CEE switch connected to the PCIe bus) is broadcast to all PCIe devices. The actual target device will receive the PCIe signals and return an acknowledgement signal, such as DEVSEL#, which is to be transmitted back to the initiating device. This will be received, along with any other appropriate PCIe signals from the actual target device, at the CEE switch. When the CEE device receives the acknowledgement signal, it will update the MAC address table to point to that particular target device. In this way, the CEE switch will know which target device to forward the CEE frames to. The CEE switch will map the PCIe signals and any other information into a CEE frame (in a similar manner as described above with the initiating device) and transmit it to the initiating device. When the CEE switch receives a CEE frame intended for a particular PCIe target device, identified for example through the CEE frame header, the CEE switch will forward the frames by extracting the appropriate PCIe signals and data and forwarding extracted data to the PCIe target device.

In one embodiment, after the entire transaction between the initiating device and the target device has completed, the CEE switch may reset its MAC address table entry containing the PCIe address the next time the PCIe bus requests availability of this connection. The entry would be reset back to the generic PCIe address. Typically, the PCIe bus is considered idle when FRAME# and IRDY# are both deasserted. The CEE initiating device may mimic a deasserted FRAME# and IRDY# in a CEE frame to the CEE switch at the end of a transaction. When there is a back-to-back transaction, the MAC address table entry containing the PCIe address of the target device is not reset. This is because data will continue to be transmitted from the CEE initiating device to the PCIe target device in subsequent transactions. When a back-to-back transaction is to occur, it may not be necessary for the handshake (address) phase to occur.

In one embodiment, the fields of an Ethernet Frame Payload, once known by the initiator or target device, may be mapped to include all known fields in subsequent CEE frames sent across a CEE network, regardless of who drives or asserts those fields.

In one embodiment, the Preamble, SOF, Destination MAC Address, Source MAC address, Length, and Frame Check Sequence fields in the Ethernet frame may be populated as is known in the art for a standard Ethernet Frame.

Figure 5A:
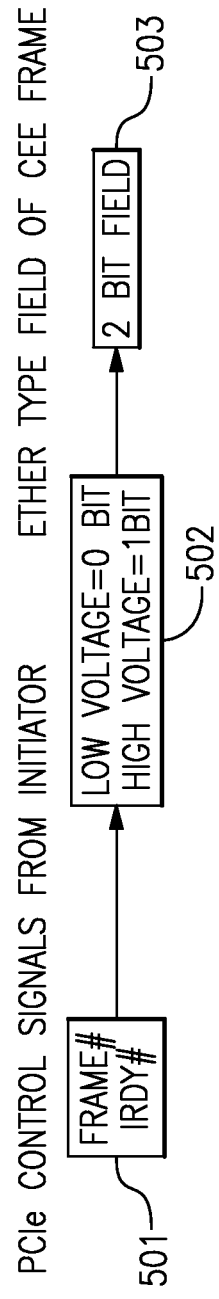
FIG. 5A illustrates one embodiment of a process for mapping PCIe control signals from an initiator into a CEE control frame in accordance with one or more aspects of the present invention.

One embodiment of a process for mapping PCIe control signals from an initiator into a CEE control frame in accordance with one or more aspects of the present invention is described in reference to FIG. 5A. The FRAME# and IRDY# control signals from the initiator, 501, may be a mimicked to be a low voltage or a high voltage. A low voltage may be mapped as a 0 bit. A high voltage may be mapped as a 1 bit, 502. This mapping may be stored into a 2 bit field, 503. This 2 bit field may correspond to the FRAME#301 and IRDY#302 fields as described in FIG. 3.

Figure 5B:
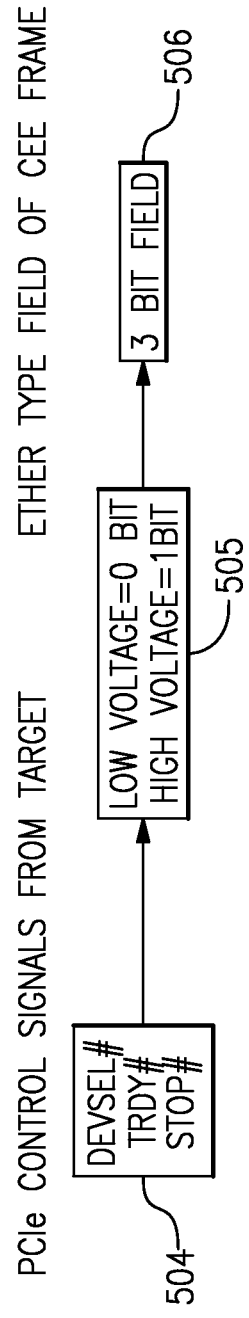
FIG. 5B illustrates one embodiment of a process for mapping PCIe control signals from a target into a CEE control frame in accordance with one or more aspects of the present invention.

One embodiment of a process for mapping PCIe control signals from a target into a CEE control frame in accordance with one or more aspects of the present invention is described in reference to FIG. 5B. The DEVSEL#, TRDY#, and STOP# control signals from the target, 504, may be a low voltage or a high voltage. A low voltage may be mapped as a 0 bit. A high voltage may be mapped as a 1 bit, 505. This mapping may be stored into a 3 bit field, 504. This 3 bit field may correspond to the DEVSEL#303, TRDY#304, and STOP#305 fields as described in FIG. 3.

Figure 6:
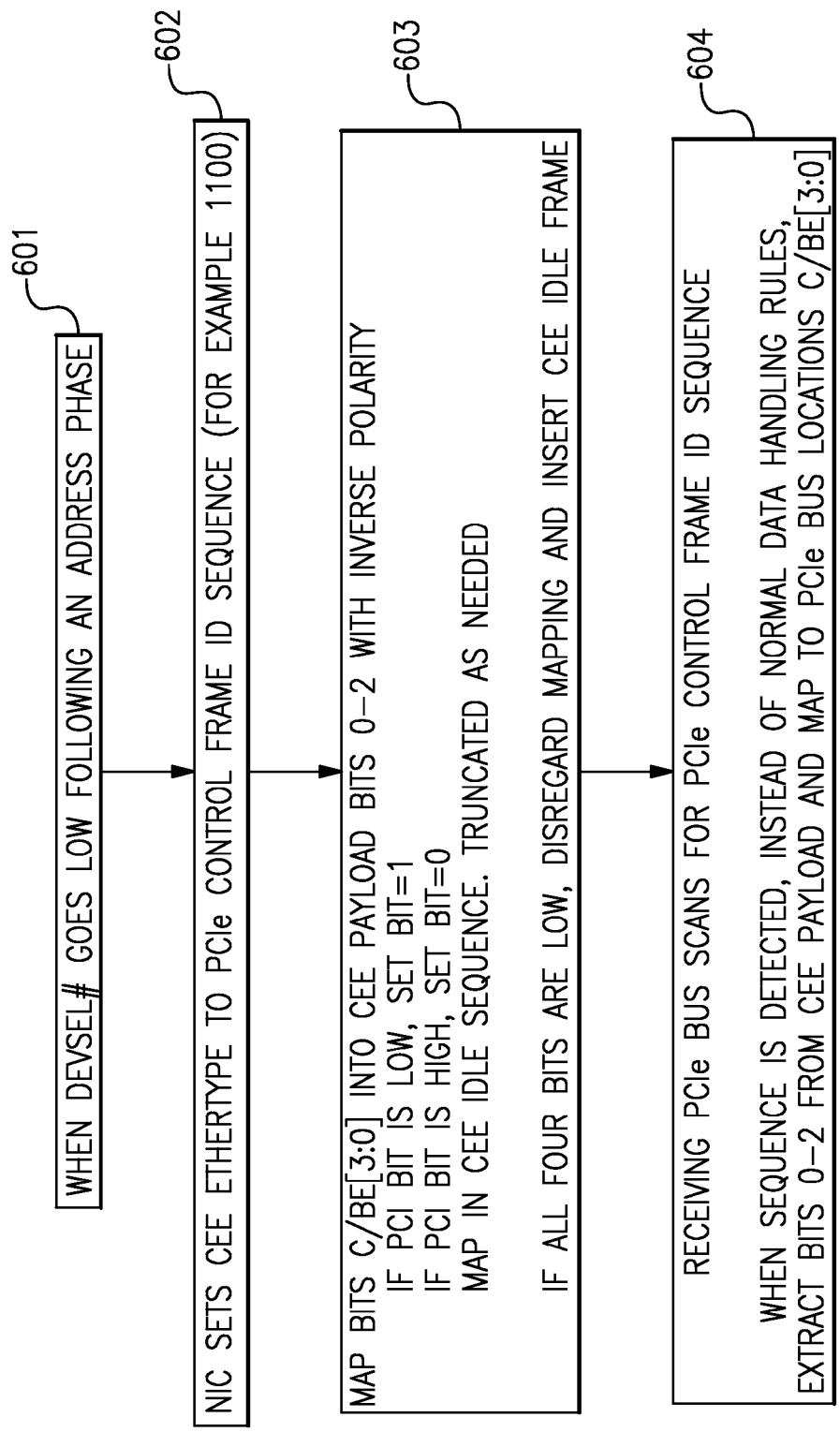
FIG. 6 illustrates one embodiment of a process for a mapping between PCIe bits and a CEE bus using an Ethertype CEE frame and payload management in accordance with one or more aspects of the present invention.

One embodiment of a process for a mapping between PCIe bits and a CEE bus using an Ethertype CEE frame and payload management in accordance with one or more aspects of the present invention is described in reference to FIG. 6. At the target device, such as a PCIe device, DEVSEL# goes low (active low) following an address phase (the handshake phase), 601. This is transmitted to the initiating device through a CEE frame. The initiating device, through a mapping device such as a NIC, sets a Type field with a PCIe control frame ID sequence, for example "1100", 602. This designates the CEE frame packet as containing PCIe information. The initiating device mimics certain PCIe control lines, for example a command C/BE[3:0], through a mapping device such as a switch, a NIC, hardware or software on the initiating device, and maps them into the CEE payload, 603. The Type mapping, the mimicked and mapped PCIe control lines also may occur in the address phase.

In one embodiment, this is mapped into CEE payload bits 0-2 with inverse polarity because a CEE network uses active high signals and because a PCIe network uses active low. So for example, if a PCIe bit is low (0), the CEE payload bit is set to high (1). If the PCIe bit is set to high (1), then the CEE payload bit is set to low (0), 603. The CEE idle sequence may be mapped as necessary, with truncations as appropriate, 603. In one embodiment, if all four CEE bits (such as mapped C/BE[3:0] and the CEE idle sequence) are low (0), the mapping is disregarded and a CEE idle frame is inserted, 603. Once the initiating device has mapped all the appropriate information, a number of CEE frames may be transmitted across to the target device. Upon receiving the CEE frames at the CEE switch connected to a PCIe device, the CEE switch checks for the PCIe control frame ID sequence, 604. If detected, the PCIe extracts the bits 0-2 from the CEE payload and maps (sends) it to the appropriate PCIe bus locations, for example C/BE[3:0]. Any additional PCIe data is also extracted. The CEE switch may read the destination MAC address field and compare it to its MAC address table to ascertain which PCIe device to send the extracted PCIe signals and data. Thus, it maps all the extracted PCIe signals and data to the appropriate PCIe bus location, 604.

Figure 7:
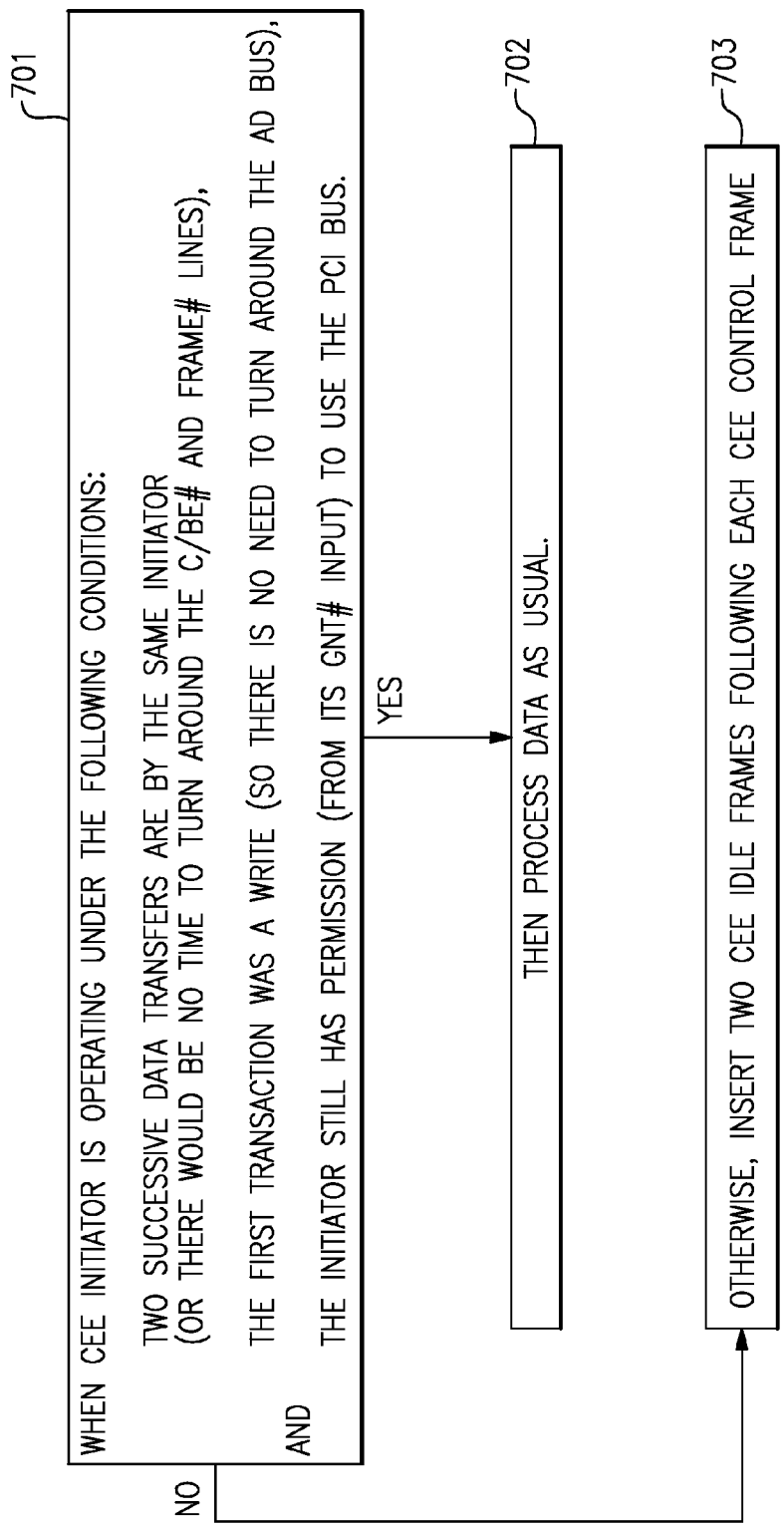
FIG. 7 illustrates one embodiment of a process for insertion of an idle frame into a CEE frame for a back-to-back transition in accordance with one or more aspects of the present invention.

One embodiment of a process for insertion of an idle frame into a CEE frame for a back-to-back transition in accordance with one or more aspects of the present invention is described in FIG. 7. A CEE initiating device may operate under the following three conditions to perform a back-to-back transaction, 701. There have been two successive data transfers by the same initiating device. The first transaction was a write (so there is no need to turn around the AD bus. The initiator still has permission, i.e. has a GNT#, to use the PCIe bus (for this condition, the CEE initiating device mimics the GNT# signal, thus this is not an issue). Once these conditions are met, the transaction proceeds as normal, 702. An idle frame may be inserted, if necessary, to synchronize the sending device (for example the initiating device) and the receiving device (for example the target device. If these conditions are not met, CEE idle frames, for example two idle frames, may be inserted into each CEE control frame at the start of a new transaction, 703, in order to comply with the idle cycle. This would allow proper timing for the turnaround cycle and the requirement to drive a control line high for one cycle.

In one embodiment, there may be long distance clustering applications on the systems. In this situation, there may be many devices attached to a computer system, such as first computer system 101 of FIG. 1. One of the devices may be one which provides long distance extensions. Hence any distance longer than the normal PCIe distance would be considered a long distance extension. In one embodiment, normal PCIe distance may be 3 meters. When the arbiter receives a request signal from a long distance extension device, after the arbiter decides to send a grant signal, it may permanently park the grant signal on that long distance extension device. In other words, the arbiter may be instructed to leave the bus grant signal on this one device while long distance transactions are taking place. In one embodiment, the long distance extension device may send a control signal to the arbiter. This control signal may instruct the arbiter to assign and leave the grant signal for the long distance extension device and to deny grant permissions to other devices for the duration of the long distance transaction. So in one embodiment, two control signals may be sent, the REQ# and this other control signal. In this situation, extra time may be allowed to take into account the latency of devices attached at extended distances. In one embodiment, the initiating device may mimic this other control signal in addition to the REQ#.

In one embodiment, a parity check is performed on every CEE frame sent across the network. This may be performed by the NIC on the initiating side (initiating device side), or by the CEE switch connected to the PCIe bus on the target side (PCIe target device side). Every CEE frame contains a parity check or frame check sequence. Thus, this can be used to check the parity with the data in the CEE frame.

In one embodiment, a master abort may be permanently avoided when dealing with a transaction. For example, the system may be configured to never allow the bus to return all-ones data over the PCIe bus. This may be done by inspecting all incoming data packet contents, for example the CEE data frames for a deasserted FRAME#. If an incoming CEE frame has a master abort, the receiving device may disregard that control signal when extracting information for PCIe bus use. If during mapping of the PCIe control signals and other fields into a CEE frame, the mapping device discovers that payload where the requested data usually resides contains all-ones data, that packet may be discarded.

In one embodiment, when there is a CEE extension, which is an extension of the CEE link into the PCIe bus, the target device will permanently assert DEVSEL# to always latch onto the first cycle. The CEE extension refers to anything longer than the normal CEE link length. In one embodiment the normal CEE link length is 10 meters on copper. The permanently asserted DEVSEL# forces the PCIe bus to always latch data on the first cycle, so that when there is an extended distance link, data can be latched on as soon as it is returned following a long idle sequence.

In one embodiment, instead of a PCIe bus and PCIe devices, a Peripheral Component Interconnect (PCI) bus with PCI devices may be utilized in the backplanes of the initiating side and the target side. Similarly, any PCI specific signals and commands may be used instead of the PCIe specific signals and commands.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 8:
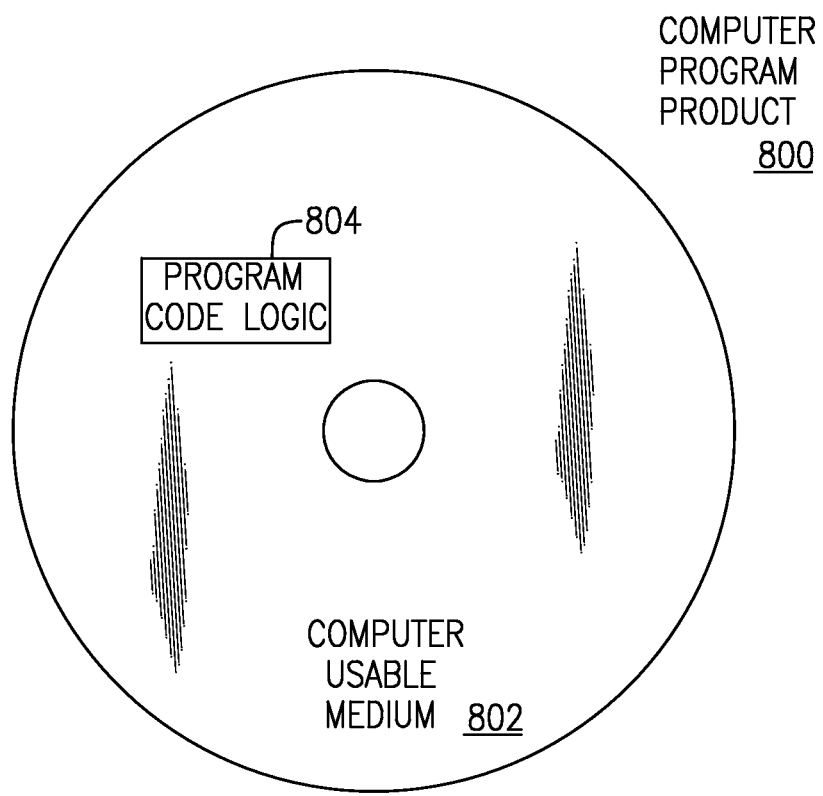
FIG. 8 illustrates one embodiment of a computer program product to incorporate one or more aspects of the present invention.

One example of a computer program product incorporating one or more aspects of an embodiment is described with reference to FIG. 8. A computer program product 800 includes, for instance, one or more computer usable media 802 to store computer readable program code means or logic 804 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
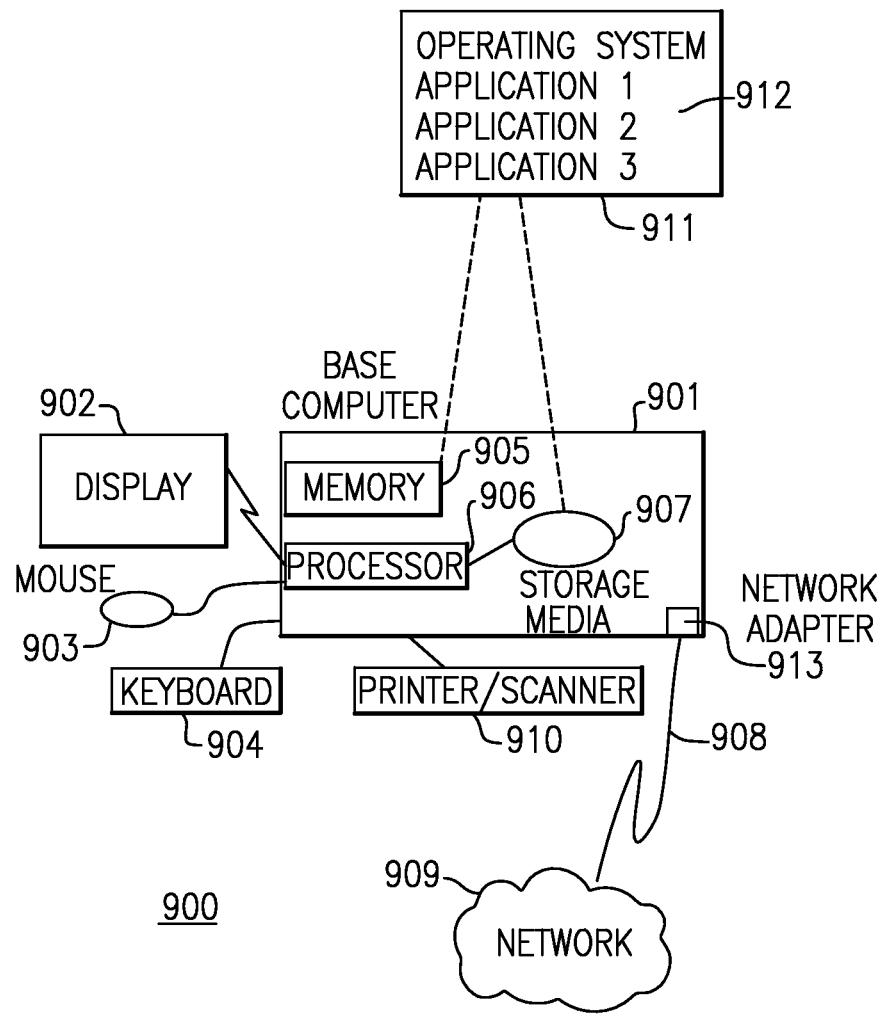
FIG. 9 illustrates one embodiment of a computer system in which an embodiment of the present invention may be practiced.

FIG. 9 illustrates an embodiment of a workstation, server hardware system, in which an embodiment may be practiced. The system comprises a computer system 901, such as a personal computer, a workstation, a server, a storage device, or host, including optional peripheral devices. The computer system 901 includes one or more processors 906 and a bus employed to connect and enable communication between the processor(s) 906 and the other components of the computer system 901 in accordance with known techniques. The bus connects the processor 906 to memory 905 and long-term storage 907 which can include a hard drive (including any of magnetic media, CD, DVD and Flash Memory for example) or a tape drive for example. The computer system 901 might also include a user interface adapter, which connects the microprocessor 906 via the bus to one or more interface devices, such as a keyboard 904, mouse 903, a printer/scanner 910 and/or other interface devices, which can be any user interface device, such as a touch sensitive screen, digitized entry pad, etc. The bus also connects a display device 902, such as an LCD screen or monitor, to the microprocessor 906 via a display adapter.

The computer system 901 may communicate with other computers or networks of computers by way of a network adapter 913, for example a network interface controller (NIC), capable of communicating 908 with a network 909. For example, network adapters may include communications channels, token ring, Ethernet or modems. Alternatively, the computer system 901 may communicate using a wireless interface, such as a CDPD (cellular digital packet data) card. The computer system 901 may be associated with such other computers in a Local Area Network (LAN), VLAN, or a Wide Area Network (WAN), or the computer system 901 may be a client in a client/server arrangement with another computer, etc. All of these configurations, as well as the appropriate communications hardware and software, are known in the art.

Software programming code which embodies an embodiment may be typically accessed by the processor 906 from long-term storage media 907. The software programming code may be embodied on any of a variety of known media for use with a data processing system, as previously described above with reference to FIG. 8. The code may be distributed on such media, or may be distributed to users from the memory or storage of one computer system over a network to other computer systems.

Alternatively, the programming code 911 may be embodied in the memory 905, and accessed by the processor 906 using the processor bus. Such programming code may include an operating system which controls the function and interaction of the various computer components and one or more application programs 912. Program code may be normally paged from storage media 907 to memory 905 where it may be available for processing by the processor 906. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A method for Converged Enhanced Ethernet (CEE) tunneling over Peripheral Component Interconnect Express (PCIe) bus, said method comprising:
    initiating, by an initiating device, a command, said initiating device connected to a CEE network;
    encoding, by an encoding device associated with said initiating device, a CEE frame, said CEE frame comprising said command, an address of a target device, one or more initiator control signals, and an address of a CEE switch closest to said target device, said target device connected to a PCIe network;
    transmitting, by said initiating device, an inquiry to said CEE switch, said inquiry transmitted through said CEE frame, said CEE switch comprising an address table, said address table comprising an entry specifying a generic PCIe device, said CEE switch configured to convert said CEE frame into PCIe readable signals, said CEE switch configured to transmit said PCIe readable signals to one or more PCIe devices connected to said PCIe network;
    receiving, by said initiating device, a response from a corresponding device from said one or more PCIe devices, said corresponding device being associated with said address of said target device, said response indicating a PCIe acknowledgment; and
    based on said response, initiating, by said initiating device, a transaction to said corresponding device through one or more CEE frames.

2. The method according to claim 1, wherein initiating, by said initiating device, a transaction further comprises:
    based on said command being a write command, transmitting, by said initiating device, one or more write command associated CEE control frames to said corresponding device, said one or more write command associated CEE control frames comprising data corresponding to said write command; and
    based on said command being a read command, receiving, by said initiating device, one or more read command associated CEE control frames from said corresponding device, said one or more read command associated CEE control frames comprising data corresponding to said read command.

3. The method according to claim 1, wherein initiating, by said initiating device, a transaction further comprises:
    based on said command being a read command, transmitting, by said corresponding device, one or more read command associated CEE control frames to said initiating device, said one or more read command associated CEE control frames comprising data corresponding to said read command; and
    based on said command being a write command, receiving, by said corresponding device, one or more write command associated CEE control frames from said initiating device, said one or more write command associated CEE control frames comprising data corresponding to said write command.

4. The method according to claim 1, further comprising:
    receiving, by a receiving device of said one or more PCIe devices, said inquiry, said inquiry comprising said address of said target device;
    based on said inquiry, checking, by said receiving device, to see if said receiving device is associated with said address of said target device; and
    based on said receiving device being associated with said address of said target device, transmitting, by said receiving device, said response to said initiating device, wherein said receiving device is said corresponding device.

5. The method according to claim 1, wherein encoding, by an encoding device associated with said initiating device, a CEE frame further comprises:
    mimicking, by said encoding device, a delay and request signal; and
    encoding, by said encoding device, said delay and said request signal into said CEE control frame.

6. The method according to claim 1, wherein encoding, by an encoding device associated with said initiating device, a CEE frame further comprises:
  mimicking, by said encoding device, said one or more initiator control signals.

7. The method according to claim 1, wherein said CEE control frame comprises a header and a payload, said header identifying said CEE control frame as PCIe, said payload comprising control signal fields corresponding to said one or more initiator signals, arbitration signals, and target control signals.

8. The method according to claim 1, wherein said CEE switch is configured to map PCIe control signals associated with said corresponding device, data associated with said corresponding device, or a combination thereof into a CEE frame.

9. The method according to claim 1, further comprising:
  performing, by said initiating device through a networking interface control, a parity check for each received CEE frame; and
  performing, by said CEE switch, a parity check for each CEE frame received at said CEE switch.

10. The method according to claim 1, further comprising:
  based on said response, updating, by said CEE switch, said address table entry specifying said generic PCIe device to an address of said corresponding device.

11. The method according to claim 10, further comprising:
  based on said transaction being complete and based on a PCIe network idle check, resetting, by said CEE switch, said update table entry specifying said corresponding device back to said generic PCIe device entry.

* * * * *